United States Patent
Yin et al.

(10) Patent No.: US 12,333,238 B2
(45) Date of Patent: Jun. 17, 2025

(54) EMBEDDING TEXTS INTO HIGH DIMENSIONAL VECTORS IN NATURAL LANGUAGE PROCESSING

(71) Applicant: AT&T Mobility II LLC, Atlanta, GA (US)

(72) Inventors: Changchuan Yin, Hoffman Estates, IL (US); Shahzad Saeed, Plainfield, IL (US)

(73) Assignee: AT&T Mobility II LLC, Atlanta, GA (US)

( * ) Notice: Subject to any disclaimer, the term of this patent is extended or adjusted under 35 U.S.C. 154(b) by 135 days.

(21) Appl. No.: 17/825,311

(22) Filed: May 26, 2022

(65) Prior Publication Data
US 2024/0005082 A1   Jan. 4, 2024

(51) Int. Cl.
*G06F 40/126* (2020.01)
*G06F 40/20* (2020.01)

(52) U.S. Cl.
CPC ............ *G06F 40/126* (2020.01); *G06F 40/20* (2020.01)

(58) Field of Classification Search
CPC ...... G06F 40/126; G06F 40/20; G06F 40/216; G06F 40/289; G06F 40/284; G06F 40/30
USPC ............................................................ 704/9
See application file for complete search history.

(56) References Cited

U.S. PATENT DOCUMENTS

| | | | |
|---|---|---|---|
| 9,037,464 B1 | 5/2015 | Mikolov et al. | |
| 11,450,124 B1* | 9/2022 | Zhang | G06N 3/09 |
| 11,625,534 B1* | 4/2023 | Agarwal | G06V 30/414 |
| | | | 704/9 |
| 11,847,106 B2* | 12/2023 | Urdiales | G06F 16/215 |
| 11,972,226 B2* | 4/2024 | Padfield | G10L 15/197 |
| 2015/0066481 A1* | 3/2015 | Terrell | G10H 1/46 |
| | | | 704/9 |
| 2016/0321243 A1* | 11/2016 | Walia | G06F 40/279 |
| 2018/0075368 A1* | 3/2018 | Brennan | G06N 5/022 |
| 2018/0157644 A1* | 6/2018 | Mandt | G06N 3/045 |
| 2018/0203851 A1* | 7/2018 | Wu | G06N 3/006 |
| 2020/0126042 A1* | 4/2020 | Jawale | H04L 12/1831 |

(Continued)

OTHER PUBLICATIONS

Devlin et al., "BERT: Pre-training of Deep Bidirectional Transformers for Language Understanding," https://arxiv.org/pdf/1810.04805v2.pdf, May 24, 2019.

(Continued)

*Primary Examiner* — Thuykhanh Le
(74) *Attorney, Agent, or Firm* — Hartman & Citrin LLC

(57) ABSTRACT

Concepts and technologies disclosed herein are directed to embedding texts into high dimensional vectors in natural language processing ("NLP"). According to one aspect, an NLP system can receive an input text that includes n number of words. The NLP system can encode the input text into a first matrix using a word embedding algorithm, such as Word2Vec algorithm. The NLP system can encode the input text into the Word2Vec by embedding each word in the n number of words of the input text into a k-dimensional Word2Vec vector using the Word2Vec algorithm. The NLP system also can decode the first matrix into a second matrix using a text embedding algorithm. In some embodiments, the second matrix is a congruence derivative matrix. The NLP system can then output the second matrix to a machine learning module that implements a machine learning technique such as short text classification.

12 Claims, 11 Drawing Sheets

(56) References Cited

U.S. PATENT DOCUMENTS

| | | | |
|---|---|---|---|
| 2021/0192149 A1* | 6/2021 | Grail | G06N 3/08 |
| 2021/0256069 A1* | 8/2021 | Grail | G06F 40/279 |
| 2021/0319785 A1* | 10/2021 | Tandecki | G06F 40/284 |
| 2021/0326675 A1* | 10/2021 | Oh | G06N 3/045 |
| 2021/0374547 A1* | 12/2021 | Wang | G06N 3/047 |
| 2022/0012763 A1* | 1/2022 | Sharma | G06N 3/048 |
| 2022/0036003 A1* | 2/2022 | Bali | G06F 40/205 |
| 2022/0076828 A1* | 3/2022 | Zhang | G06F 16/31 |
| 2022/0100962 A1* | 3/2022 | Akhalwaya | G06N 3/08 |
| 2022/0138424 A1* | 5/2022 | Gong | G06V 30/1983 |
| 2022/0180057 A1* | 6/2022 | Garcia Santa | G06N 3/084 |
| 2022/0188513 A1* | 6/2022 | Kitamura | G06F 40/279 |
| 2022/0198141 A1* | 6/2022 | Hudson | G06V 10/82 |
| 2022/0237376 A1* | 7/2022 | Wang | G06F 40/253 |
| 2022/0237567 A1* | 7/2022 | Tiwari | G06Q 10/1053 |
| 2022/0247700 A1* | 8/2022 | Bhardwaj | G06N 3/044 |
| 2022/0350825 A1* | 11/2022 | van de Nieuwegiessen | G06F 40/35 |
| 2022/0358361 A1* | 11/2022 | Otsuka | G06F 40/56 |
| 2022/0374426 A1* | 11/2022 | Thai | G06N 5/041 |
| 2023/0012722 A1* | 1/2023 | Del Rosario | G06N 3/02 |
| 2023/0034085 A1* | 2/2023 | Shalev | G06F 40/126 |
| 2023/0074968 A1* | 3/2023 | Gookin | G06N 3/0464 |
| 2023/0195773 A1* | 6/2023 | Zhang | G06F 40/242 707/737 |
| 2023/0214595 A1* | 7/2023 | Agarwal | G06F 16/906 704/9 |
| 2023/0237272 A1* | 7/2023 | Teixeira de Abreu Pinho | G06F 40/284 704/9 |
| 2023/0244868 A1* | 8/2023 | Yuan | G06F 40/284 704/9 |
| 2023/0274102 A1* | 8/2023 | Marie | G06N 20/00 704/2 |
| 2023/0274126 A1* | 8/2023 | Vijapur Gopinath Rao | G06N 3/0464 706/21 |
| 2023/0298627 A1* | 9/2023 | Marzorati | G11B 27/031 |
| 2023/0334267 A1* | 10/2023 | Perez | G06N 3/0455 |
| 2023/0367969 A1* | 11/2023 | Chaturvedi | G10L 15/1815 |
| 2024/0111955 A1* | 4/2024 | Kirch | G06F 40/295 |

OTHER PUBLICATIONS

Mikolov et al., "Efficient Estimation of Word Representations in Vector Space," https://arxiv.org/pdf/1301.3781.pdf, Sep. 7, 2013.

Mikolov et al., "Distributed Representations of Words and Phrases and their Compositionality," Proceedings of the 26th International Conference on Neural Information Processing Systems, vol. 2, Dec. 2013, pp. 3111-3119.

Pennington et al., "GloVe: Global Vectors for Word Representation," Proceedings of the 2014 Conference on Empirical Methods in Natural Language Processing, Oct. 25-29, 2014, pp. 1532-1543.

Yin et al., "Periodic power spectrum with applications in detection of latent periodicities in DNA sequences," Journal of Mathematical Biology 73, Apr. 2016, pp. 1053-1079.

\* cited by examiner

EMBEDDING TEXTS INTO HIGH DIMENSIONAL VECTORS IN NATURAL LANGUAGE PROCESSING

BACKGROUND

Natural language processing ("NLP") is of high importance in artificial intelligence ("AI") applications in modern society. NLP helps machines to understand natural language for applications such as speech recognition, machine translation, and sentiment analysis. Regular text formats are often difficult for directly detecting semantic patterns. Moreover, regular text formats cannot be effectively processed by mathematical and machine learning algorithms. Therefore, embedding and transforming texts into numerical values are prerequisites in NLP of texts in any AI applications.

The indispensable keys to NLP are word and text embedding methods that transform words and texts into numerical values (e.g., numerical vectors). Word embedding is to transform a word into numerals, while text embedding is to transform a text into numerals. A text consists of multiple words in orders. Texts can be one or more sentences, one or more phrases, one or more paragraphs, or an entire document. After words and texts are transformed into numerical values, mathematical and machine learning algorithms can process and compute the words and texts as numerical values. Some commonly used word embedding methods are One-Hot encoding, Term Frequency Inverse Document Frequency ("TF-IDF"), Word2Vec, and Global Vectors for Word Representation ("GloVe").

One-Hot encoding is used to create a vocabulary size binary vector initially filled with zeros except one. For a single word, only a corresponding column is filled with the value 1 and the rest of the positions are zeros. Therefore, the One-Hot encoded vectors consist of a sparse vector of a high dimension, where the dimension is the size of the dictionary. Because of the large size of the dictionary, the dimension of the One-Hot encoded vector can be huge—equal to the size of the dictionary. The high dimension of the One-Hot encoding vector prevents the practical application of this method in NLP.

The TF-IDF method represents a word with its frequency proportional to its counts in texts, but inversely proportional to the frequency of the word in the text corpus. TF-IDF is an effective representation of words in large texts (e.g., documents), but TF-IDF is less powerful in retaining word contexts in short texts such as a TWITTER message (known as a "tweet") and customer comments in reviews and surveys.

The word embedding methods Word2Vec and GloVe are powerful to transform words into vectors. The Word2Vec method constructs an embedding of words such that similar words have similar vector representations. The Word2Vec embedding of words can be obtained using word contexts of a common bag of words ("CBOW") or skip gram in neural networks. In the CBOW architecture, the neural network model uses the current word to predict the surrounding window of context words. The skip-gram architecture weighs nearby context words more heavily than more distant context words. The embedding mechanism in Word2Vec and GloVe is through neural network training in which inputs are the bag of word vectors and the targets are the context (orders) of words in sentences. The resulting intermediate vectors in the hidden layer of the model are the embedded word vectors (Word2Vec). GloVe's encoding of words is through an unsupervised learning on aggregated global word-word co-occurrence statistics from a corpus. GloVe representations express linear structures of the word vector space. Both Word2Vec and GloVe require machine learning training from a text corpus, limiting the usages in a broad range of specific business applications.

Word embeddings only generate numerical vectors of words, but do not produce numerical vectors for the texts that contain the words. Consequently, the embedding methods of Word2Vec and GloVe are non-contextual embeddings. In many NLP applications, texts (e.g., sentences, phrases, paragraphs, or documents) are required to be transformed into numerical vectors. One text embedding approach is first to embed each word using word embedding methods (e.g., Word2Vec or GloVe), and then combine all the different word vectors by summing or averaging the word vectors. However, this approach fails to capture word contexts and orders of words in the individual texts.

The latest and advanced text embedding method is Bidirectional Encoder Representations from Transformer ("BERT"). BERT considers all the words of the input sentence simultaneously and then uses an attention mechanism to develop a contextual meaning of the words. BERT is context-dependent, which means that even same words may have different embedding because BERT pays attention to the neighboring words before generating the embedding. BERT is functionally different from the word embedding algorithms Word2Vec and GloVe. Word2Vec and GloVe are for word embedding, while BERT is for text embedding.

SUMMARY

Concepts and technologies disclosed herein are directed to embedding texts into high dimensional vectors in NLP. According to one aspect disclosed herein, an NLP system can receive an input text. The input text can include n number of words. The NLP system can encode the input text into a first matrix using a word embedding algorithm. In some embodiments, the word embedding algorithm can be a Word2Vec algorithm, and the first matrix can be a Word2Vec matrix. The NLP system can encode the input text into the Word2Vec by embedding each word in the n number of words of the input text into a k-dimensional Word2Vec vector using the Word2Vec algorithm. The NLP system also can decode the first matrix into a second matrix using a text embedding algorithm. In some embodiments, the second matrix is a congruence derivative matrix. The NLP system can then output the second matrix. In some embodiments, the NLP system can output the second matrix to a machine learning module. The machine learning module can be part of the NLP system or a separate system such as a standalone machine learning system. In some embodiments, the machine learning module implements short text classification.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DETAILED DESCRIPTION

Figure 1:
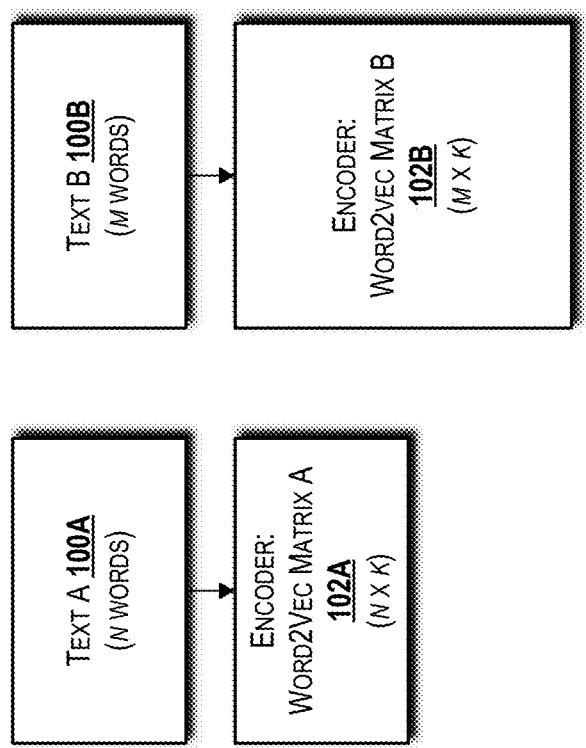
FIG. 1 is a block diagram of a problem of encoding texts of different lengths into Word2Vec matrices.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for embedding texts into high dimensional vectors in NLP will be described.

The concepts and technologies disclosed herein are directed to embedding texts into high dimensional vectors in NLP. The concepts and technologies disclosed herein provide a spatial-temporal text embedding method for use in NLP and NLU applications to effectively compute numeric representations of texts.

Referring now to FIG. 1, a diagram illustrating a problem of encoding texts of different lengths into Word2Vec matrices will be described. The diagram shows individual words of texts 100A, 100B that are embedded into a numerical vector of high-dimensional space by the Word2Vec method. In particular, a first text ("Text A") 100A includes n words and can be encoded into a first Word2Vec matrix ("Word2Vec Matrix A") 102A having dimensions n×k, and a second text ("Text B") 100B includes m words and can be encoded into a second Word2Vec matrix ("Word2Vec Matrix B") 102B having dimensions m×k. For two texts of n and m words, respectively, (i.e., Text A 100A and Text B 100B in this example), if each word is embedded into a k-dimensional numerical vector, the two texts will be embedded into matrices of different dimensions, n×k, m×k, m≠n. Therefore, different texts have different embedding matrix dimensions in the Word2Vec embedding method.

To apply a machine learning method on texts having a different number of words, the texts embedding should have the same dimensions so that the input features sizes provided to a machine learning method are consistent. Because machine learning algorithms require uniform dimensions in input training data, the direct Word2Vec embedding method is not feasible for use in machine learning applications. In NLP tasks, such as text classification and sentiment analysis, a machine learning model is built upon a given text corpus, and the classification or sentiment can be predicted using the machine learning model. However, using a word embedding method (e.g., Word2Vec), different texts will be encoded into different dimensional matrices. The concepts and technologies disclosed herein address this text embedding problem by embedding texts having a different number of words into matrices of uniform dimension.

The following mathematical concepts and definitions are proposed in the text embedding method (also referred to as "txt2vec") as disclosed herein. A congruence derivative vector can be used to reflect both periodic and contextual features of a time series. Therefore, congruence derivative vectors of different dimensions of a time series can capture the intrinsic characteristic of the time series and can be descriptive features of the time series. The concepts and technologies disclosed herein extend the congruence derivative vector in NLP text embedding of high dimension. More particularly, for a real number sequence x of length n, $x=[x_0, x_1, x_2, \ldots, x_{n-1}]$, if two positive integers m and p satisfy n=mp, then its congruence derivative vector, y, with length of p, is defined by the equation below. It should be noted that if the sequence length does not satisfy n=mp, then padding zeros can be added to the original sequence to satisfy the sequence length condition.

$$y_t = \frac{p}{n}\sum_{j=0}^{m-1} x_{jp+t}, t = 0, 1, \ldots p-1$$

The congruence derivative vectors of a number p can be derived from the congruence vector of the number q, if p is a factor of q. Therefore, the concepts and technologies disclosed herein only consider congruence derivative vectors of prime numbers of a time series. For an integer p, the congruence derivative vector size is p; however, because the last element of the congruence derivative vector can be derived from the previous p−1 elements and the sum of the time series, the last element of the congruence derivative vector is excluded. Therefore, the actual congruence derivative vector size is p−1. A special case is that when p=1, the congruence derivative vector contains one element, which is the mean of the time series.

Figure 2:
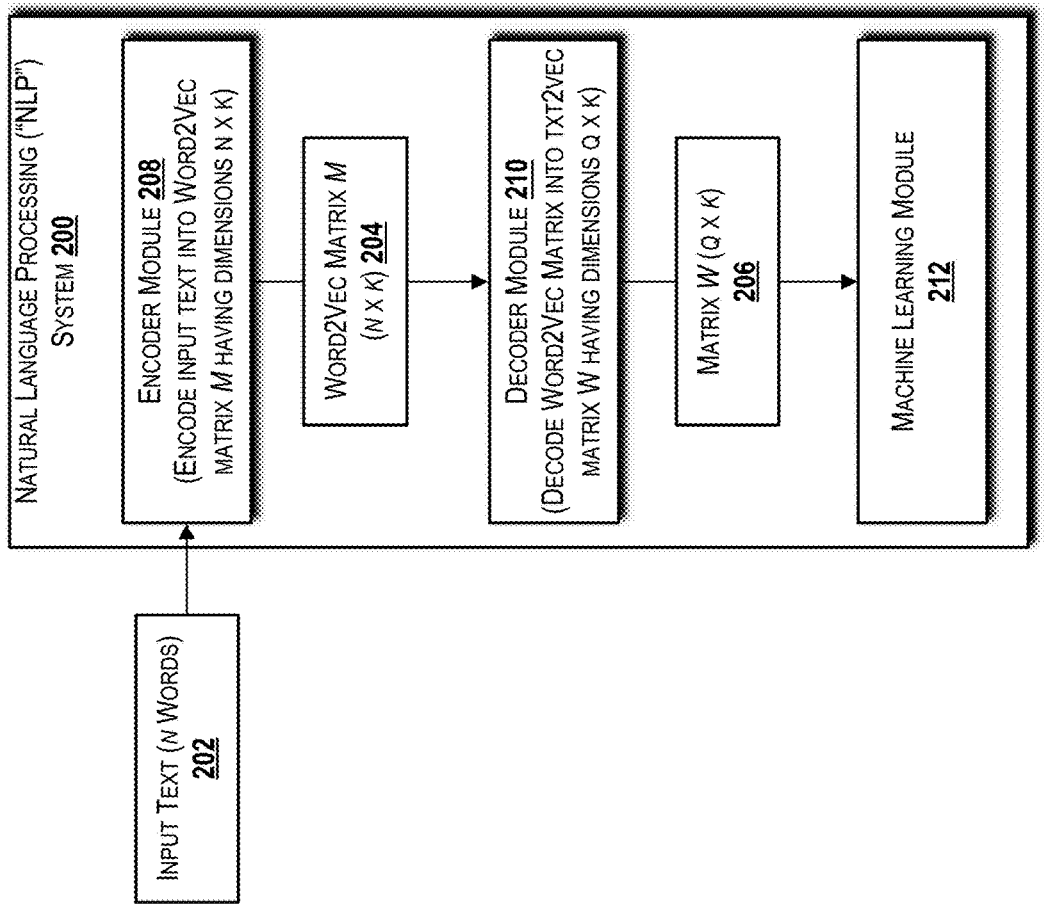
FIG. 2 is a block diagram illustrating an example NLP system configured to execute a novel text embedding method ("txt2vec"), according to an illustrative embodiment.

Turning now to FIG. 2, a block diagram illustrating an example NLP system 200 configured to execute the novel text embedding method ("txt2vec") disclosed herein will be described, according to an illustrative embodiment. The NLP system 200 can perform two main steps to apply txt2vec. First, the NLP system 200 can encode input text 202 (of n words) into a Word2Vec matrix M 204 using the existing Word2Vec embedding method. Then, the NLP system 200 can decode the Word2Vec matrix M 204 into a congruence derivative matrix W 206 (also referred to herein as "txt2vec matrix W"). To summarize, the text embedding vector can be constructed by the Word2Vec matrix M 204 of the words in the input text 202 and the congruence derivative vectors of the Word2Vec matrix M 204. More particularly, for the input text 202 of n words, the NLP system 200 can execute an encoder module 208 to first embed each word in the input text 202 into a k-dimensional Word2Vec vector using the Word2Vec algorithm. If the Word2Vec size is 1×k, then the Word2Vec matrix M 204 of the input text 202 has the dimensions of n×k. The NLP system 200 then can execute a decoder module 210 to transform the Word2Vec matrix M 204 into the txt2vec matrix W 206 using the congruence derivative vector representation as follows.

It should be noted that the rows in a Word2Vec matrix (e.g., the matrix M 204) of a text (e.g., the input text 202) are the Word2Vec vectors of the words in the text. Thus, the Word2Vec matrix can be considered as a multivariate time series. Each column of the Word2Vec matrix M 204 can be transformed into congruence vectors of lengths p=1 and prime numbers $p_i$=2, 3, 5. It should be noted that the prime numbers can be any prime numbers. The prime numbers 2, 3, and 5 are used herein as one exemplary example, but the prime numbers for the congruence derivative vectors can be any prime numbers in practice.

If j prime numbers are used, after transformation of the Word2Vec matrix M 204 of the input text 202 of n words, the txt2vec matrix W 206 has dimensions of Q×k, where Q=1+$\Sigma_{i=0}^{j}(p_i-1)$. Therefore, for the texts of different words, the dimensions of the txt2vec matrices are the same. The property of having the same dimension of the txt2vec matrices of texts is important because the input sizes of machine learning model training and prediction must be the same. Additionally, the same size of the congruence derivative matrices allows computing the similarity of texts of different word sizes. For example, for the input text 202 of n=35 words, if the dimension of the Word2Vec is k=100, then the Word2Vec matrix M 204 of the input text 202 is 35×100 (i.e., n×k). The congruence derivative vector of each column of the Word2Vec matrix M 204 has size as: 1+1+2+4=8. The txt2vec matrix W 206 size is 8×Word2VecDimension=8×100. When flattening the txt2vec matrix W 206 as a vector via a machine learning module 212, the txt2vec vector size is 1×800.

The txt2vec method described herein can be applied to numerous applications, some of which are now described as exemplary examples. Those skilled in the art will appreciate applicability of the txt2vec method to other applications not explicitly disclosed herein. As such, the following applications should not be construed as being limiting in any way.

Short text classification shows promise in NLP tasks, such as customer review analytics, sentiment analysis, and the like. Short texts, such as a customer review, however, usually contain a variety of synonyms, abbreviations, and/or imprecise expressions. Furthermore, short texts often have diverse word usages and are mixed with noise words and symbols, which can lead to semantic ambiguity. These inherent problems make short text analytics challenging in actual business applications.

A real world business application of short text classification is to recognize errors in a customer survey. Customer surveys are often provided to customers after a service is rendered. The survey may ask the customer to rate their experience using a score (e.g., a score between 1 and 5, with 1 corresponding to the lowest score and 5 to the highest score). Some customers may not read the survey instructions and submit a score that is not indicative of their intention. For example, a customer may consider 1 to be the highest score and 5 to be the lowest score, in which case the customer may rate their experience a 1 thinking they have provided the highest score available, when, in fact, the customer rated their experience as poor. Often times the score an individual, department, branch, company, or other entity receives may impact the entity financially, reputationally, and/or otherwise. To mitigate the impacts of customer mistakes in survey inputs, many companies need to manually correct survey errors. Manual corrections use score correlations and verbatim review. For example, a score of 1 appears incorrect if accompanied by a glowing review with no negative sentiment. Manually reviewing the score and the accompanying text is time-consuming and inefficient, particularly when survey mistakes are prevalent.

Using customer comment data, an automatic processing method can be created for recognizing survey scoring errors. Customers may input short correction comments in a text field (e.g., to provide written feedback/review), such as "James was helpful. I am sorry, my score for 'Question 1' should be 5," or "I hit the wrong button, Q1 is 5," or the like. Therefore, identification of survey errors is a text classification problem, and more specifically, it is a short text classification problem.

The proposed txt2vec method can be implemented as a core component of an AI method that can recognize a survey error. Using the txt2vec training data, a machine learning model can be built using manually curated survey data and predict and discern the survey mistakes. Because the word contexts in short texts are short, in short text classifications, the stop words in texts are kept as-is. The word2vec of the words in short texts are first trained using the short texts that are collected in the customer surveys. The training is performed by the Word2Vec neural network. The short texts are then represented by the Word2Vec for each word in the texts. In training the text classification neural network model, the training data are short texts, wherein each short text is embedded into numerical vectors using the txt2vec method described herein. It should be noted that the customer error data in the training data has very low volume, and therefore up-sampling the customer error data is needed for training the neural network model.

In classification using the trained neural network model, a given short text is embedded into a numerical vector using the txt2vec method. The numerical txt2vec vectors of the texts are the inputs for training the neural network model. For a given customer verbatim text, the text is first transformed into txt2vec vector, and using the trained neural network model, the class of a given text (i.e., customer errors or regular verbatims) can be predicted.

To classify short texts, the neural network model is created and trained using the short texts of customer comments. The short texts are first embedded into txt2vec numerical vector. It should be noted that the neural network can be a classical multiple layers network. The neural network can include one input layer (dimension size 800), one hidden layer of 800 neurons, and one output layer of one node. The activation function in the hidden layer can be ReLu, and the activation function in the output layer can be sigmoid function. The neural network model for short text classification can be Tensorflow 2.2. The neural network model can be trained using the text embedded numerical arrays by the proposed txt2vec embedding methods. An example of the performance of the neural network model is illustrated in FIGS. 3A-3D.

Figure 3A:
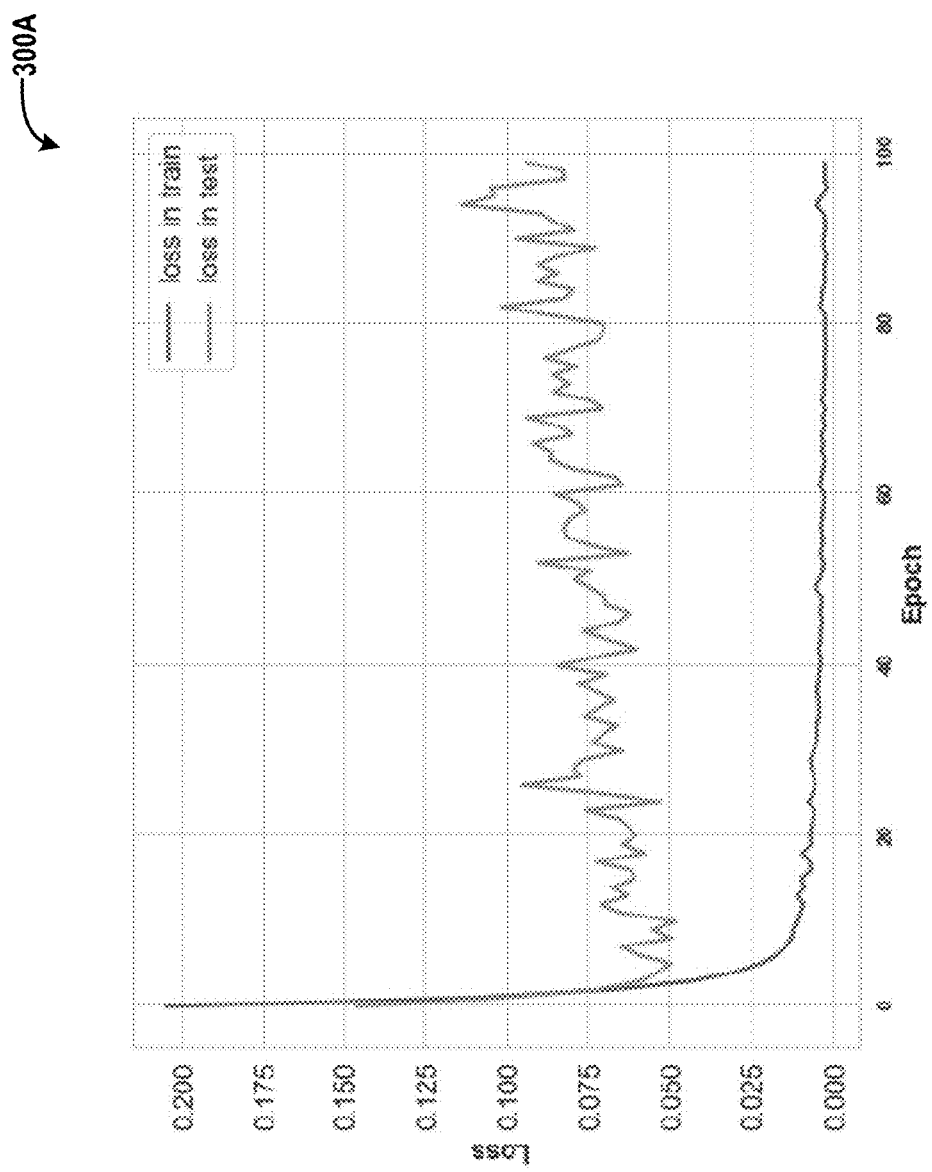
FIGS. 3A-3D are graphs illustrating example performance aspects of a neural network model for short texts classification.
Figure 3B:
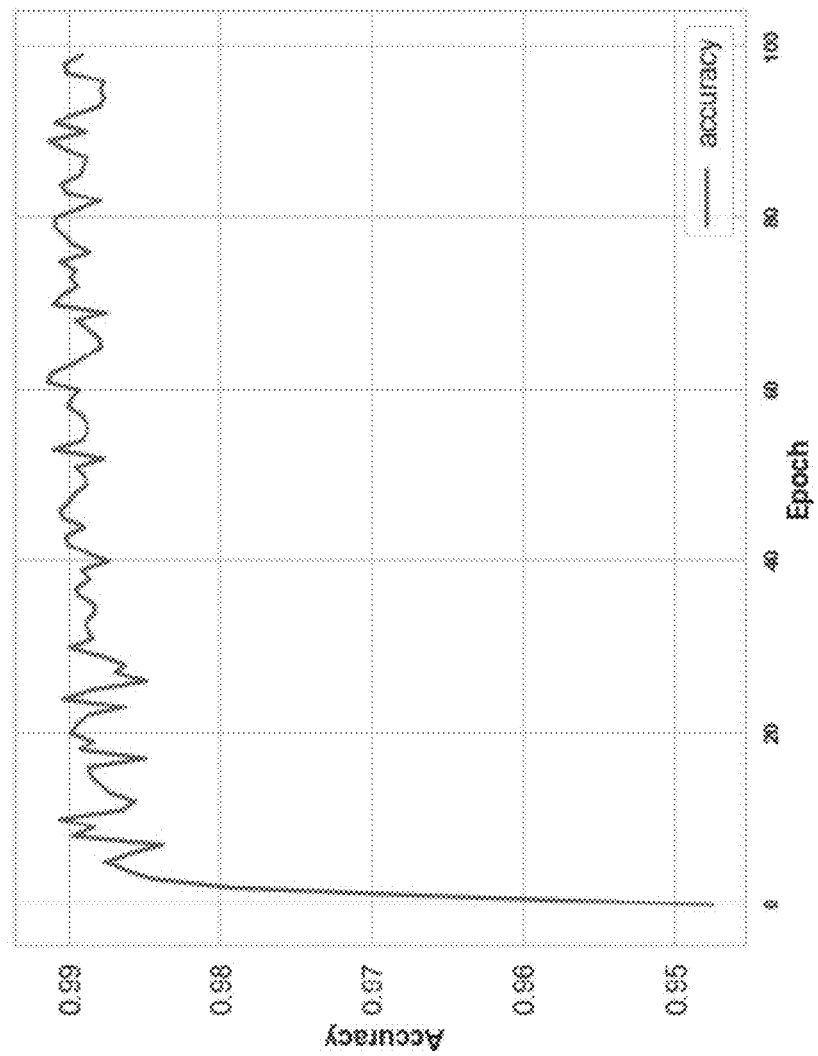
Figure 3C:
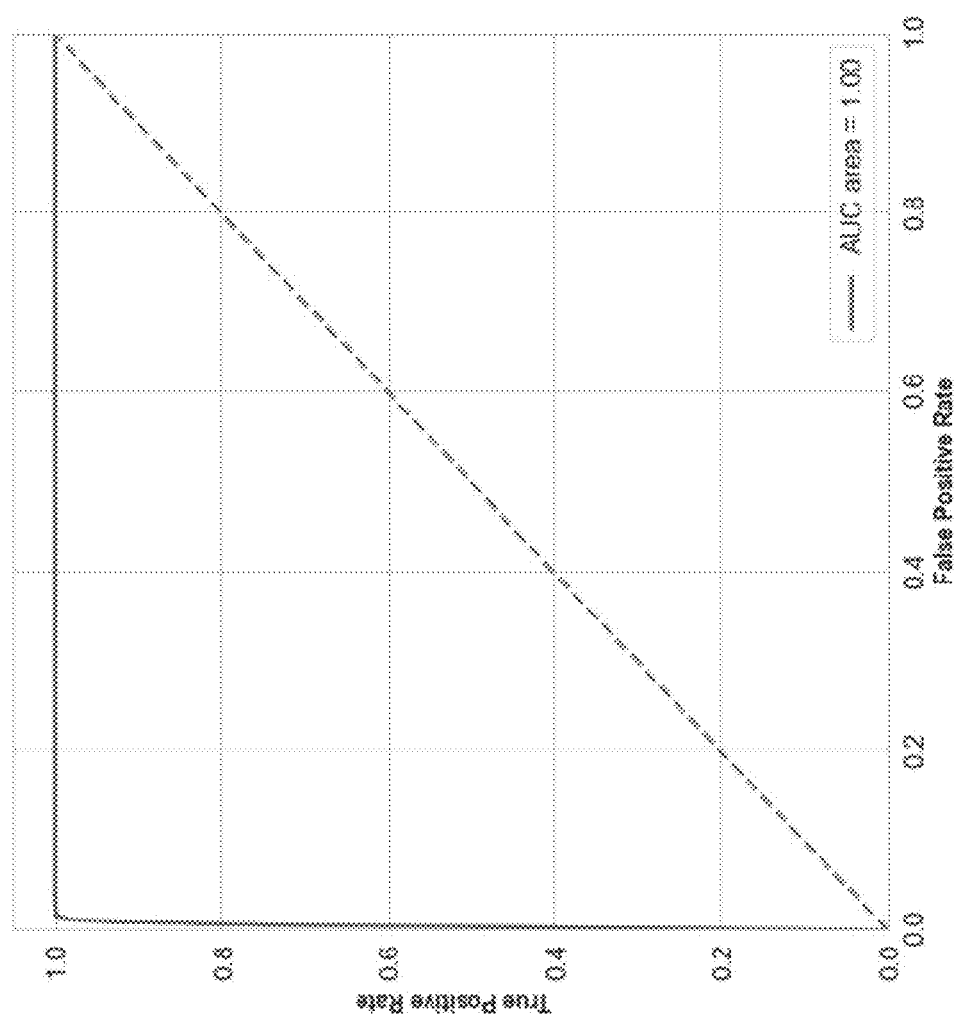
Figure 3D:
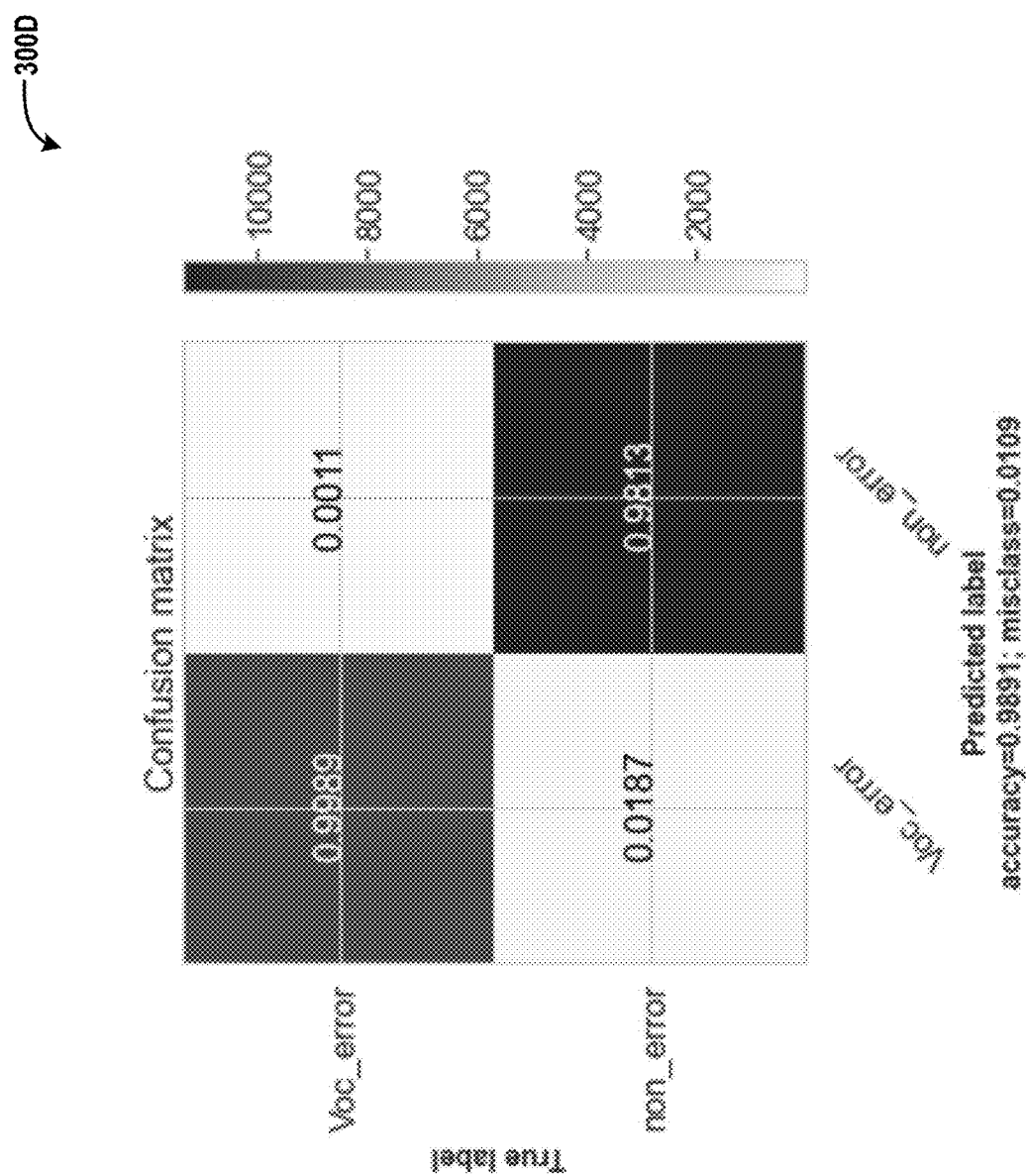

Turning now to FIGS. 3A-3D, graphs 300A-300D depicting various performance aspects of a neural network model for short texts classification will be described. In FIG. 3A, a graph 300A depicts the losses of the train and test processes in model training. In FIG. 3B, a graph 300B depicts the classification accuracy of the model during training (98.8% without over-fitting). In FIG. 3C, a graph 300C depicts the receiver operating characteristic ("ROC") curve of the final model (AUC of 1.0). In FIG. 3D, a graph 300D depicts the confusion matrix of the final model.

Words and texts represented by numerical vector may be seamlessly analyzed by mathematical and digital signal processing, and machine learning methods. The numerical representation of words and texts can be applied in a broad range of applications in natural language processing and understanding. One example is the document and text classifications. As being demonstrated above, txt2vec can be used in classification of documents and texts, including short texts. Another example is sentiment analysis. The sentiments in the texts can be extracted using the txt2vec representations.

Figure 4:
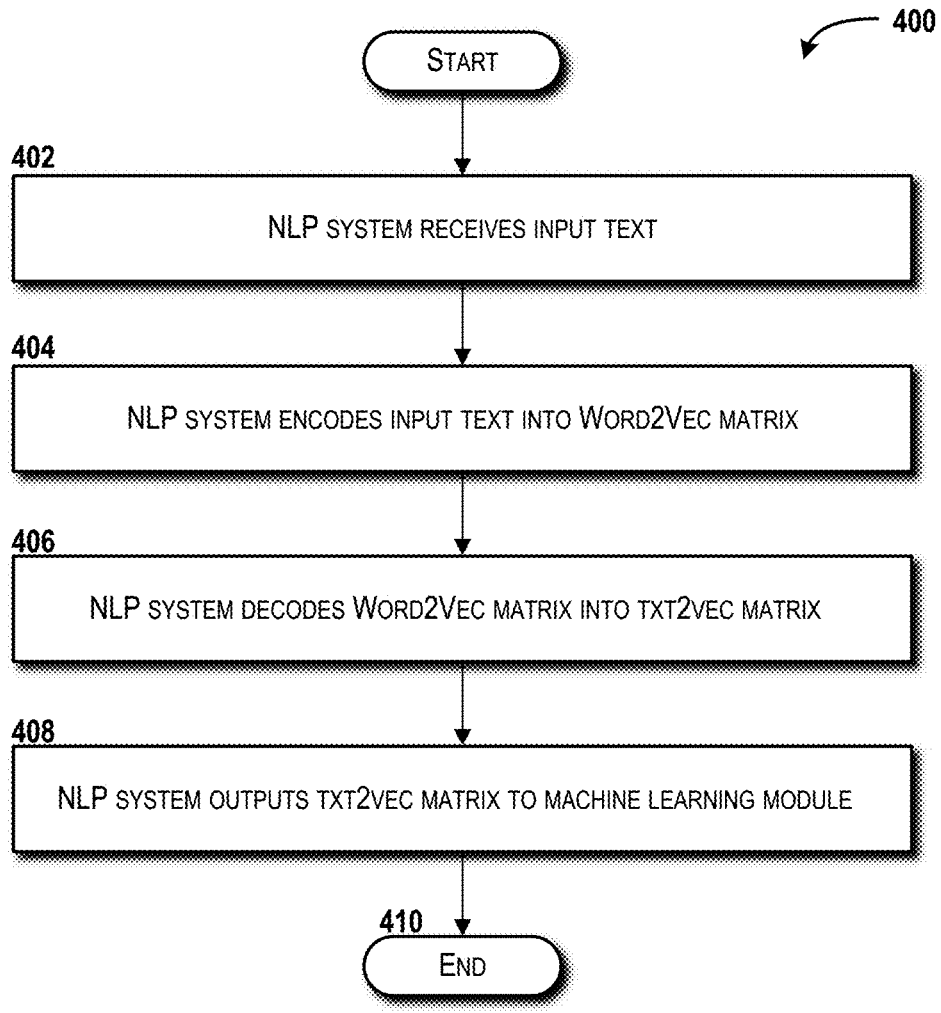
FIG. 4 is a flow diagram illustrating a method for embedding texts into high dimensional vectors in NLP, according to an illustrative embodiment.

Turning now to FIG. 4, a flow diagram illustrating a method 400 for embedding texts into high dimensional vectors in NLP will be described, according to an illustrative embodiment. The method 400 will be described with reference to FIG. 4 and additional reference to FIG. 2. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, operations of the methods disclosed herein may be described as being performed, at least in part, by the NLP system 200, via execution, by one or more processors, of one or more software modules, such as the encoder module 208, the decoder module 210, and the machine learning module 212. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 begins and proceeds to operation 402. At operation 402, the NLP system 200 receives input text 202 having a size of n words. The input text 202 can be multiple words in order, one or more sentences, one or more phrases, one or more paragraphs, or an entire document. As mentioned above, the concepts and technologies disclosed herein can be used for short text classification, of which customer review analytics and sentiment analysis are two example use cases. The application of the concepts and technologies disclosed herein and the potential use cases of that application are not limited to those described herein. As such, any example applications and use cases described herein should not be construed as being limiting in any way.

From operation 402, the method 400 proceeds to operation 404. At operation 404, the NLP system 200, via execution by one or more processors of the encoder module 208, encodes the input text 202 into a Word2Vec matrix M 204 having dimensions n×k. The operation 404 uses the existing Word2Vec algorithm. It is contemplated, however, that variations of the Word2Vec algorithm, derivatives of the Word2Vec algorithm, functionally the same or similar algorithms to the Word2Vec algorithm, and/or other algorithms that provide substantially the same result as the Word2Vec algorithm may be used by the NLP system 200 to perform the operation 404. As such, the use of the Word2Vec algorithm in particular should not be construed as being limiting in any way.

From operation 404, the method 400 proceeds to operation 406. At operation 406, the NLP system 200 decodes the Word2Vec matrix M 204 into the txt2vec matrix W 206 (also referred to herein as "congruence derivative matrix") having dimensions Q×k using the congruence derivative vector representation described above.

From operation 406, the method 400 proceeds to operation 408. At operation 408, the NLP system 200 outputs the txt2vec matrix W 206 to the machine learning module 212. As mentioned above, the concepts and technologies disclosed herein are applicable to numerous use cases with one non-limiting example use case being short text classification. As such, the machine learning module 212 can be used to implement short text classification. As another non-limiting example, the machine learning module 212 can be used to extract sentiments from texts.

From operation 408, the method 400 proceeds to operation 410. The method 400 can end at operation 410.

Figure 5:
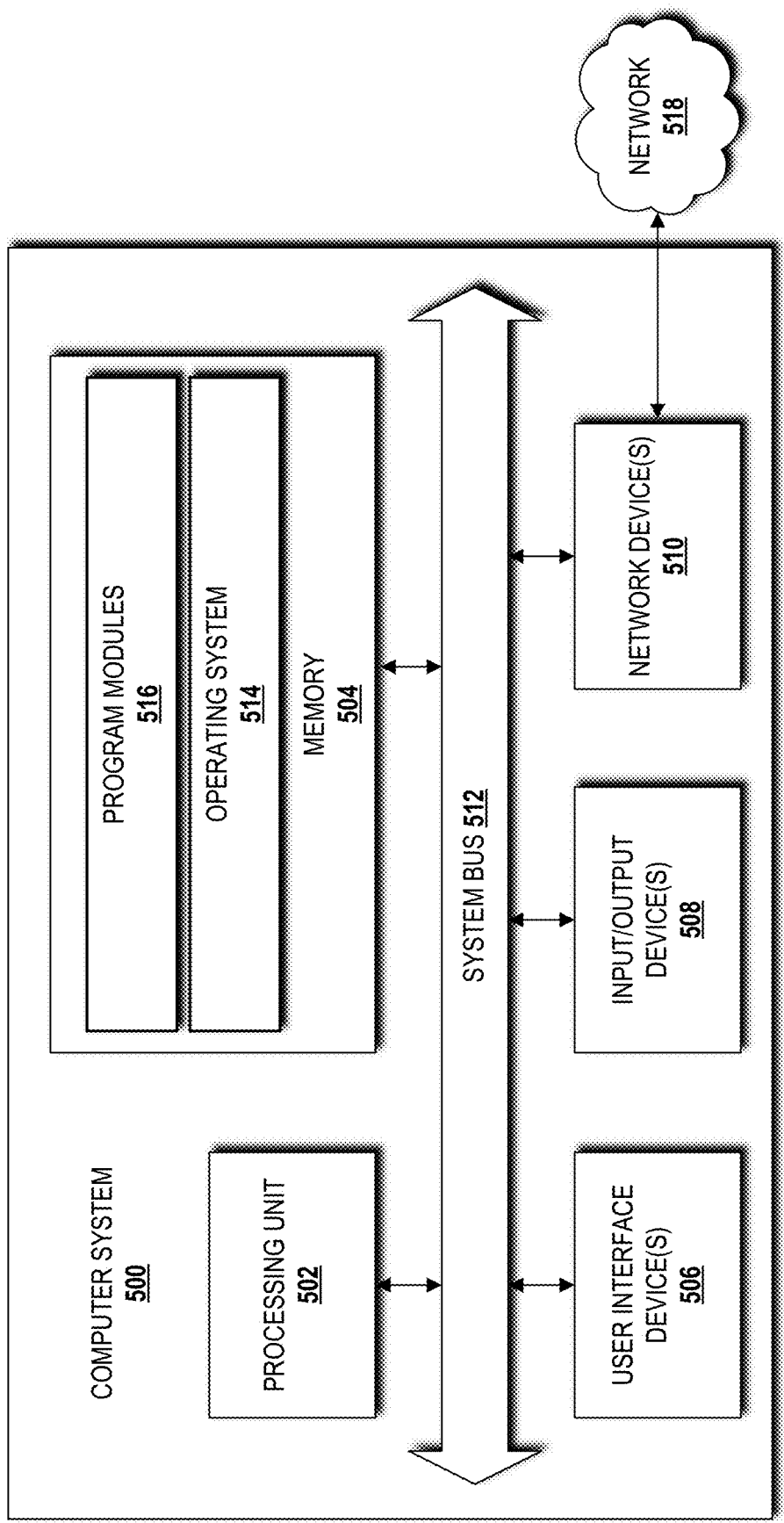
FIG. 5 is a block diagram illustrating an example computer system capable of implementing aspects of the embodiments presented herein.

Turning now to FIG. 5 is a block diagram illustrating a computer system 500 configured to provide the functionality in accordance with various embodiments of the concepts and technologies disclosed herein. The systems, devices, and other components disclosed herein, such as the NLP system 200, can be implemented, at least in part, using an architecture that is the same as or similar to the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEB SD family of operating systems, the SOLARIS family of operating systems from ORACLE CORPORATION, other operating systems, and the like.

The program modules 516 may include various software and/or program modules to perform the various operations described herein such as the encoder module 208, the decoder module 210, and the machine learning module 212. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium," "computer-readable storage medium," and variations thereof does not include waves or signals per se and/or communication media, and therefore should be construed as being directed to "non-transitory" media only.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518. Examples of the network devices 510 include, but are not limited to, a modem, a radio frequency ("RF") or infrared ("IR") transceiver, a telephonic interface, a bridge, a router, or a network card. The network 518 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be or may include a wired network such as, but not limited to, a Wide Area Network ("WAN"), a wired Personal Area Network ("PAN"), or a wired Metropolitan Area Network ("MAN").

Figure 6:
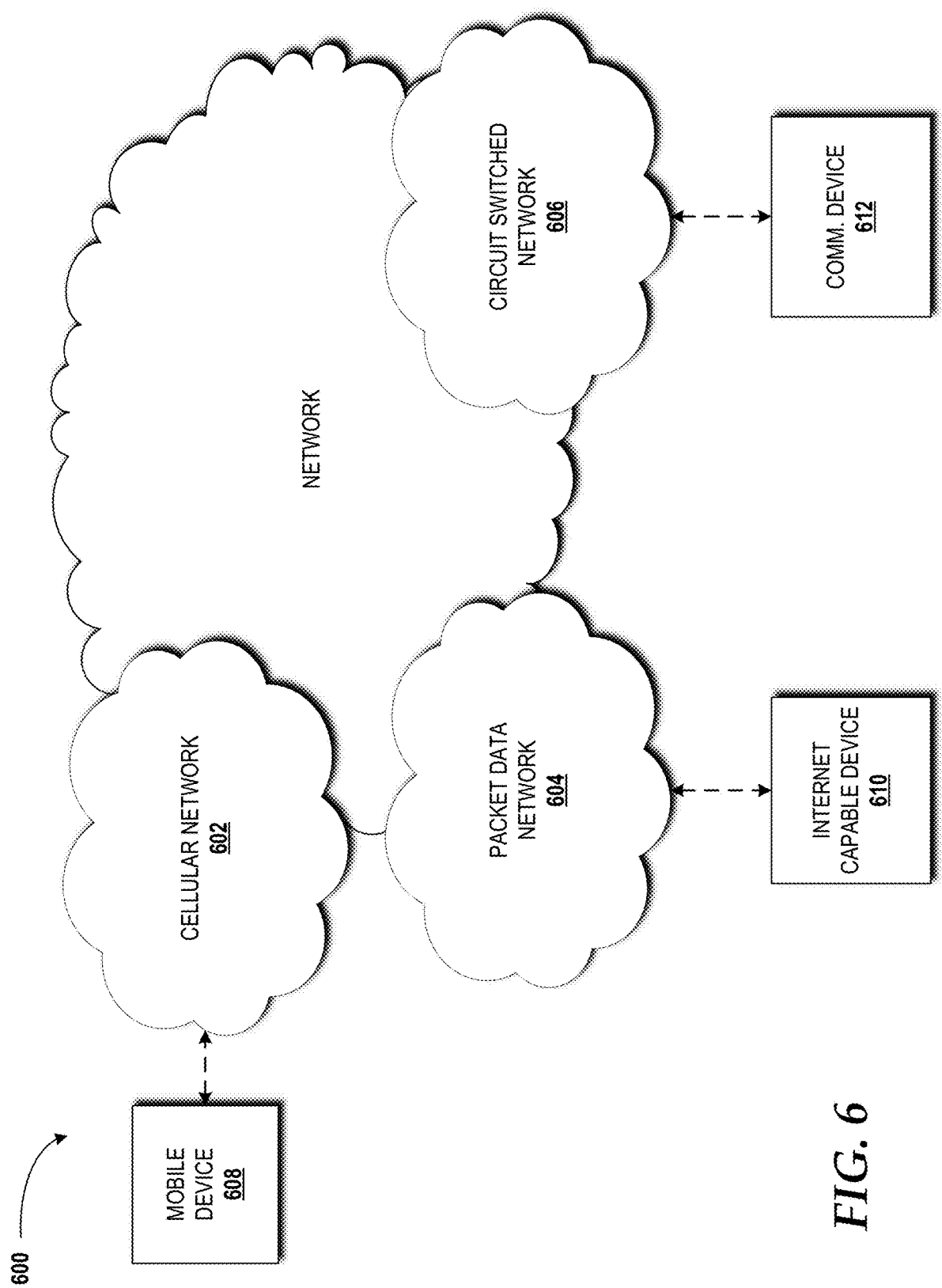
FIG. 6 is a diagram illustrating a network, according to an illustrative embodiment.

Turning now to FIG. 6, details of a network 600 are illustrated, according to an illustrative embodiment. In some embodiments, the network 600 can include the network 518 (best shown in FIG. 5). The network 600 includes a cellular network 602, a packet data network 604, for example, the Internet, and a circuit switched network 606, for example, a public switched telephone network ("PSTN"). The cellular network 602 includes various components such as, but not limited to, base transceiver stations ("BTSs"), NB s or eNBs, combination eNB/gNB, base station controllers ("B SCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, the NLP system 200, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the NLP system 200, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network is used to refer broadly to any combination of the networks 602, 604, 606 shown in FIG. 6. It should be appreciated that substantially all of the functionality described with reference to the network(s) 106 can be performed by the cellular network 602, the packet data network 604, and/or the circuit switched network 606, alone or in combination with other networks, network elements, and the like.

Figure 7:
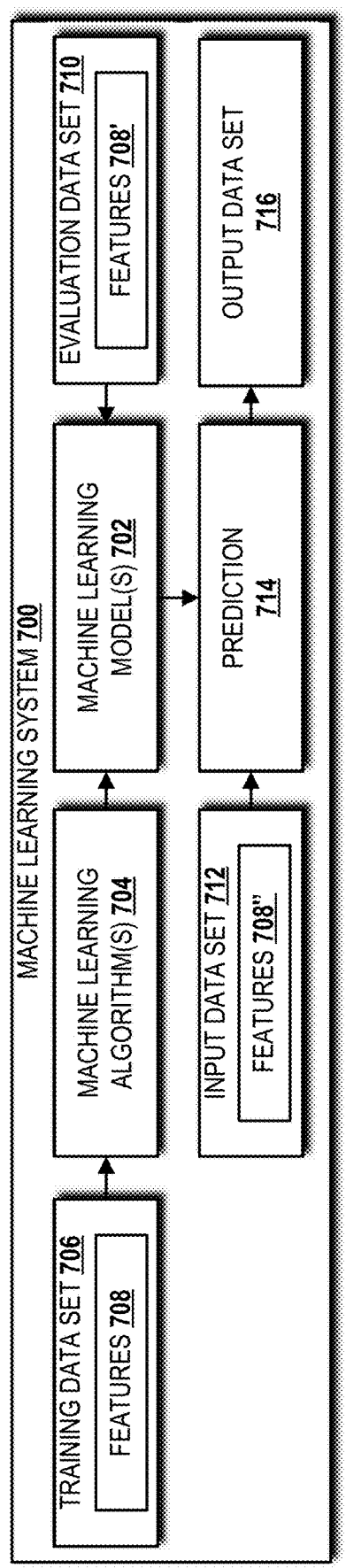
FIG. 7 is a block diagram illustrating a machine learning system capable of implementing aspects of the concepts and technologies disclosed herein.

Turning now to FIG. 7, a machine learning system 700 capable of implementing aspects of the embodiments disclosed herein will be described. In some embodiments, the NLP system 200 via the machine learning module 212 can implement or otherwise utilize a machine learning system such as the machine learning system 700. The illustrated machine learning system 700 includes one or more machine learning models 702. The machine learning models 702 can include supervised and/or semi-supervised learning models. The machine learning model(s) 702 can be created by the machine learning system 700 based upon one or more machine learning algorithms 704. The machine learning algorithm(s) 704 can be any existing, well-known algorithm, any proprietary algorithms, or any future machine learning algorithm. Some example machine learning algorithms 704 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 704 based upon the problem(s) to be solved by machine learning via the machine learning system 700.

The machine learning system 700 can control the creation of the machine learning models 702 via one or more training parameters. In some embodiments, the training parameters are selected modelers at the direction of an enterprise, for example. Alternatively, in some embodiments, the training parameters are automatically selected based upon data provided in one or more training data sets 706. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 704 converges to the optimal weights. The machine learning algorithm 704 can update the weights for every data example included in the training data set 706. The size of an update is controlled by the learning rate. A learning rate that is too high might prevent the machine learning algorithm 704 from converging to the optimal weights. A learning rate that is too low might result in the machine learning algorithm 704 requiring multiple training passes to converge to the optimal weights.

The model size is regulated by the number of input features ("features") 708 in the training data set 706. A greater the number of features 708 yields a greater number of possible patterns that can be determined from the training data set 706. The model size should be selected to balance the resources (e.g., compute, memory, storage, etc.) needed for training and the predictive power of the resultant machine learning model 702.

The number of training passes indicates the number of training passes that the machine learning algorithm 704 makes over the training data set 706 during the training process. The number of training passes can be adjusted based, for example, on the size of the training data set 706, with larger training data sets being exposed to fewer training passes in consideration of time and/or resource utilization.

The effectiveness of the resultant machine learning model 702 can be increased by multiple training passes.

Data shuffling is a training parameter designed to prevent the machine learning algorithm 704 from reaching false optimal weights due to the order in which data contained in the training data set 706 is processed. For example, data provided in rows and columns might be analyzed first row, second row, third row, etc., and thus an optimal weight might be obtained well before a full range of data has been considered. By data shuffling, the data contained in the training data set 706 can be analyzed more thoroughly and mitigate bias in the resultant machine learning model 702.

Regularization is a training parameter that helps to prevent the machine learning model 702 from memorizing training data from the training data set 706. In other words, the machine learning model 702 fits the training data set 706, but the predictive performance of the machine learning model 702 is not acceptable. Regularization helps the machine learning system 700 avoid this overfitting/memorization problem by adjusting extreme weight values of the features 708. For example, a feature 708 that has a small weight value relative to the weight values of the other features 708 in the training data set 706 can be adjusted to zero.

The machine learning system 700 can determine model accuracy after training by using one or more evaluation data sets 710 containing the same features 708' as the features 708 in the training data set 706. This also prevents the machine learning model 702 from simply memorizing the data contained in the training data set 706. The number of evaluation passes made by the machine learning system 700 can be regulated by a target model accuracy that, when reached, ends the evaluation process and the machine learning model 702 is considered ready for deployment.

After deployment, the machine learning model 702 can perform a prediction operation ("prediction") 714 with an input data set 712 having the same features 708" as the features 708 in the training data set 706 and the features 708' of the evaluation data set 710. The results of the prediction 714 are included in an output data set 716 consisting of predicted data. The machine learning model 702 can perform other operations, such as regression, classification, and others. As such, the example illustrated in FIG. 7 should not be construed as being limiting in any way.

Figure 8:
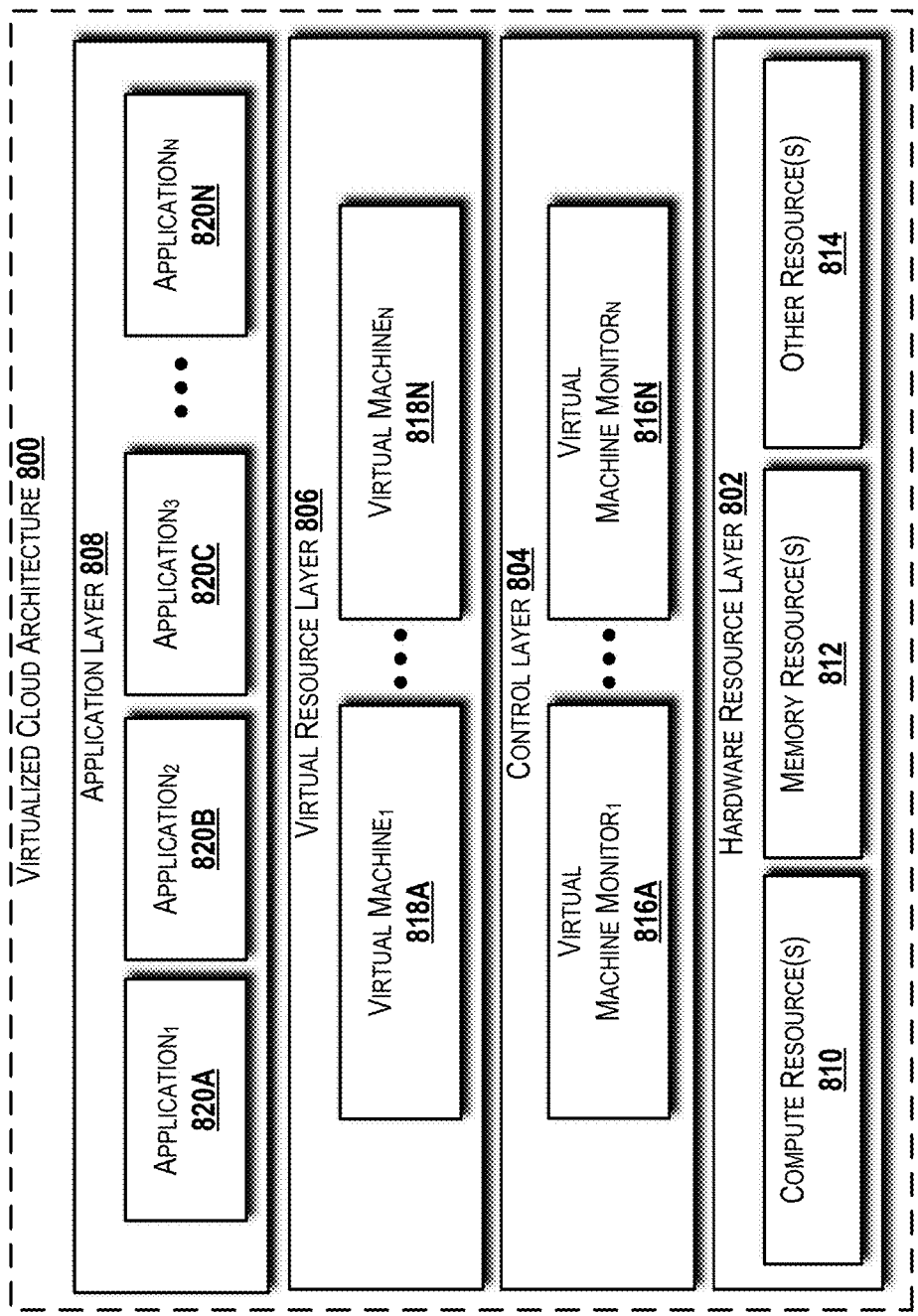
FIG. 8 is a block diagram illustrating a virtualized cloud architecture capable of implementing aspects of the concepts and technologies disclosed herein.

Turning now to FIG. 8, a block diagram illustrating an example virtualized cloud architecture 800 and components thereof will be described, according to an exemplary embodiment. In some embodiments, the virtualized cloud architecture 800 can be utilized to implement, at least in part, the NLP system 200 or portions thereof. The virtualized cloud architecture 800 is a shared infrastructure that can support multiple services and network applications. The illustrated virtualized cloud architecture 800 includes a hardware resource layer 802, a control layer 804, a virtual resource layer 806, and an application layer 808 that work together to perform operations as will be described in detail herein.

The hardware resource layer 802 provides hardware resources, which, in the illustrated embodiment, include one or more compute resources 810, one or more memory resources 812, and one or more other resources 814. The compute resource(s) 810 can include one or more hardware components that perform computations to process data, and/or to execute computer-executable instructions of one or more application programs, operating systems, and/or other software. The compute resources 810 can include one or more central processing units ("CPUs") configured with one or more processing cores. The compute resources 810 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 810 can include one or more discrete GPUs. In some other embodiments, the compute resources 810 can include CPU and GPU components that are configured in accordance with a co-processing CPU/GPU computing model, wherein the sequential part of an application executes on the CPU and the computationally-intensive part is accelerated by the GPU. The compute resources 810 can include one or more system-on-chip ("SoC") components along with one or more other components, including, for example, one or more of the memory resources 812, and/or one or more of the other resources 814. In some embodiments, the compute resources 810 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 810 can be or can include one or more hardware components architected in accordance with an advanced reduced instruction set computing ("RISC") machine ("ARM") architecture, available for license from ARM HOLDINGS. Alternatively, the compute resources 810 can be or can include one or more hardware components architected in accordance with an x86 architecture, such an architecture available from INTEL CORPORATION of Mountain View, California, and others. Those skilled in the art will appreciate the implementation of the compute resources 810 can utilize various computation architectures, and as such, the compute resources 810 should not be construed as being limited to any particular computation architecture or combination of computation architectures, including those explicitly disclosed herein.

The memory resource(s) 812 can include one or more hardware components that perform storage operations, including temporary or permanent storage operations. In some embodiments, the memory resource(s) 812 include volatile and/or non-volatile memory implemented in any method or technology for storage of information such as computer-readable instructions, data structures, program modules, or other data disclosed herein.

Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 810.

The other resource(s) 814 can include any other hardware resources that can be utilized by the compute resources(s) 810 and/or the memory resource(s) 812 to perform operations described herein. The other resource(s) 814 can include one or more input and/or output processors (e.g., network interface controller or wireless radio), one or more modems, one or more codec chipset, one or more pipeline NLP processors, one or more fast Fourier transform ("FFT") processors, one or more digital signal processors ("DSPs"), one or more speech synthesizers, and/or the like.

The hardware resources operating within the hardware resource layer 802 can be virtualized by one or more virtual machine monitors ("VMMs") 816A-816N (also known as "hypervisors," hereinafter "VMMs 816") operating within the control layer 804 to manage one or more virtual resources that reside in the virtual resource layer 806. The VMMs 816 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 810, the memory resources 812, the other resources 814, or any combination thereof. These abstractions are referred to herein as virtual machines ("VMs"). In the illustrated embodiment, the virtual resource layer 806 includes VMs 818A-818N (hereinafter "VMs 818"). Each of the VMs 818 can execute one or more applications 820A-820N in the application layer 808.

Based on the foregoing, it should be appreciated that concepts and technologies directed to embedding texts into high dimensional vectors in NLP have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    receiving, by a natural language processing system comprising a processor, a first input text comprising n number of words;
    receiving, by the natural language processing system, a second input text comprising m number of words, wherein the n number of words of the first input text is different than the m number of words of the second input text;
    encoding, by the natural language processing system, the first input text into a first matrix using a word embedding algorithm, wherein the word embedding algorithm comprises a Word2Vec algorithm, wherein the first matrix of the first input text comprises a Word2Vec matrix of the first input text, and wherein encoding the first input text into the Word2Vec matrix of the first input text using the Word2Vec algorithm comprises embedding each word in the n number of words of the first input text into a k-dimensional Word2Vec vector using the Word2Vec algorithm resulting in the Word2Vec matrix of the first input text having a dimension of n×k;
    encoding, by the natural language processing system, the second input text into a first matrix using the word embedding algorithm comprising the Word2Vec algorithm, wherein the first matrix of the second input text comprises a Word2Vec matrix of the second input text, wherein encoding the second input text into the Word2Vec matrix of the second input text using the Word2Vec algorithm comprises embedding each word in the m number of words of the second input text into a k-dimensional Word2Vec vector using the Word2Vec algorithm resulting in the Word2Vec matrix of the second input text having a dimension of m×k, and wherein the dimension of n×k of the Word2Vec matrix of the first input text is different from the dimension of m×k of the Word2Vec matrix of the second input text;
    decoding, by the natural language processing system, the first matrix of the first input text into a second matrix of the first input text using a text embedding algorithm, wherein decoding the first matrix of the first input text into the second matrix of the first input text using the text embedding algorithm comprises decoding the Word2Vec matrix of the first input text into a first congruence derivative matrix using a congruence derivative vector representation, and wherein the first congruence derivative matrix has a first dimension;
    decoding, by the natural language processing system, the first matrix of the second input text into a second matrix of the second input text using the text embedding algorithm, wherein decoding the first matrix of the second input text into the second matrix of the second input text using the text embedding algorithm comprises decoding the Word2Vec matrix of the second input text into a second congruence derivative matrix using the congruence derivative vector representation, wherein the second congruence derivative matrix has a second dimension, and wherein decoding the Word2Vec matrix of the first input text into the first congruence derivative matrix using the congruence derivative vector representation and decoding the Word2Vec matrix of the second input text into the second congruence derivative matrix using the congruence derivative vector representation results in the first dimension of the first congruence derivative matrix of the first input text being equal to the second dimension of the second congruence derivative matrix of the second input text; and
    using, by a machine learning module executed by the natural language processing system, the first congruence derivative matrix and the second congruence derivative matrix as training data for a machine learning model, wherein the machine learning module requires matrices used for the training data to have uniform dimensions, and wherein using the first congruence derivative matrix and the second congruence derivative matrix as training data for a machine learning model comprises
        creating, by the machine learning module of the natural language processing system, the machine learning model, and
        passing, by the machine learning module of the natural language processing system, the first congruence derivative matrix and the second congruence derivative matrix through the machine learning model to train the machine learning model to determine mistakes in other input texts.

2. The method of claim 1, wherein the first input text comprises multiple words in order, one or more sentences, one or more phrases, one or more paragraphs, or an entire document.

3. The method of claim 1, wherein the second input text comprises multiple words in order, one or more sentences, one or more phrases, one or more paragraphs, or an entire document.

4. The method of claim 1, wherein the machine learning module implements, based at least in part on the training data, short text classification.

5. A natural language processing system comprising
a processor; and
a memory comprising a machine learning module and instructions that, when executed by the processor, cause the processor to perform operations comprising
receiving a first input text comprising n number of words,
receiving a second input text comprising m number of words, wherein the n number of words of the first input text is different than the m number of words of the second input text,
encoding the first input text into a first matrix using a word embedding algorithm, wherein the word embedding algorithm comprises a Word2Vec algorithm, wherein the first matrix of the first input text comprises a Word2Vec matrix, and wherein encoding the first input text into the Word2Vec matrix of the first input text using the Word2Vec algorithm comprises embedding each word in the n number of words of the first input text into a k-dimensional Word2Vec vector using the Word2Vec algorithm resulting in the Word2Vec matrix of the first input text having a dimension of n×k,
encoding the second input text into a first matrix using the word embedding algorithm comprising the Word2Vec algorithm, wherein the first matrix of the second input text comprises a Word2Vec matrix of the second input text, wherein encoding the second input text into the Word2Vec matrix of the second input text using the Word2Vec algorithm comprises embedding each word in the m number of words of the second input text into a k-dimensional Word2Vec vector using the Word2Vec algorithm resulting in the Word2Vec matrix of the second input text having a dimension of m×k, and wherein the dimension of n×k of the Word2Vec matrix of the first input text is different from the dimension of m×k of the Word2Vec matrix of the second input text,
decoding the first matrix of the first input text into a second matrix of the first input text using a text embedding algorithm, wherein decoding the first matrix of the first input text into the second matrix of the first input text using the text embedding algorithm comprises decoding the Word2Vec matrix of the first input text into a first congruence derivative matrix using a congruence derivative vector representation, and wherein the first congruence derivative matrix has a first dimension
decoding the first matrix of the second input text into a second matrix of the second input text using the text embedding algorithm, wherein decoding the first matrix of the second input text into the second matrix of the second input text using the text embedding algorithm comprises decoding the Word2Vec matrix of the second input text into a second congruence derivative matrix using the congruence derivative vector representation, wherein the second congruence derivative matrix has a second dimension, and wherein decoding the Word2Vec matrix of the first input text into the first congruence derivative matrix using the congruence derivative vector representation and decoding the Word2Vec matrix of the second input text into the second congruence derivative matrix using the congruence derivative vector representation results in the first dimension of the first congruence derivative matrix of the first input text being equal to the second dimension of the second congruence derivative matrix of the second input text,
using, by the machine learning module, the first congruence derivative matrix and the second congruence derivative matrix as training data for a machine learning model, wherein the machine learning module requires matrices used for the training data to have uniform dimensions, and wherein using the first congruence derivative matrix and the second congruence derivative matrix as training data for a machine learning model comprises
creating, by the machine learning module, the machine learning model, and
passing, by the machine learning module, the first congruence derivative matrix and the second congruence derivative matrix through the machine learning model to train the machine learning model to determine mistakes in other input texts.

6. The natural language processing system of claim 5, wherein the first input text comprises multiple words in order, one or more sentences, one or more phrases, one or more paragraphs, or an entire document.

7. The natural language processing system of claim 5, wherein the second input text comprises multiple words in order, one or more sentences, one or more phrases, one or more paragraphs, or an entire document.

8. The natural language processing system of claim 5, wherein the machine learning module implements, based at least in part on the training data, short text classification.

9. A computer-readable storage medium comprising a machine learning module and computer-executable instructions that, when executed by a processor, cause the processor to perform operations comprising:
receiving a first input text comprising n number of words;
receiving a second input text comprising m number of words, wherein the n number of words of the first input text is different than the m number of words of the second input text;
encoding the first input text into a first matrix using a word embedding algorithm, wherein the word embedding algorithm comprises a Word2Vec algorithm, wherein the first matrix of the first input text comprises a Word2Vec matrix of the first input text, and wherein encoding the first input text into the Word2Vec matrix of the first input text using the Word2Vec algorithm comprises embedding each word in the n number of words of the first input text into a k-dimensional Word2Vec vector using the Word2 Vec algorithm resulting in the Word2Vec matrix of the first input text having a dimension of n×k;
encoding the second input text into a first matrix using the word embedding algorithm comprising the Word2Vec algorithm, wherein the first matrix of the second input text comprises a Word2Vec matrix of the second input text, wherein encoding the second input text into the Word2Vec matrix of the second input text using the Word2Vec algorithm comprises embedding each word in the m number of words of the second input text into a k-dimensional Word2Vec vector using the Word2Vec algorithm resulting in the Word2Vec matrix of the second input text having a dimension of m×k, and wherein the dimension of n×k of the Word2Vec matrix of the first input text is different from the dimension m x k of the Word2Vec matrix of the second input text;

decoding the first matrix of the first input text into a second matrix of the first input text using a text embedding algorithm, wherein decoding the first matrix of the first input text into the second matrix of the first input text using the text embedding algorithm comprises decoding the Word2Vec matrix of the first input text into a first congruence derivative matrix using a congruence derivative vector representation, and wherein the first congruence derivative matrix has a first dimension;

decoding the first matrix of the second input text into a second matrix of the second input text using the text embedding algorithm, wherein decoding the first matrix of the second input text into the second matrix of the second input text using the text embedding algorithm comprises decoding the Word2Vec matrix of the second input text into a second congruence derivative matrix using the congruence derivative vector representation, wherein the second congruence derivative matrix has a second dimension, and wherein decoding the Word2Vec matrix of the first input text into the first congruence derivative matrix using the congruence derivative vector representation and decoding the Word2Vec matrix of the second input text into the second congruence derivative matrix using the congruence derivative vector representation results in the first dimension of the first congruence derivative matrix of the first input text being equal to the second dimension of the second congruence derivative matrix of the second input text; and using, by the machine learning module, the first congruence derivative matrix and the second congruence derivative matrix as training data for a machine learning model, wherein the machine learning module requires matrices used for the training data to have uniform dimensions, and wherein using the first congruence derivative matrix and the second congruence derivative matrix as training data for a machine learning model comprises creating, by the machine learning module, the machine learning model, and passing, by the machine learning module, the first congruence derivative matrix and the second congruence derivative matrix through the machine learning model to train the machine learning model to determine mistakes in other input texts.

10. The computer-readable storage medium of claim 9, wherein the first input text comprises multiple words in order, one or more sentences, one or more phrases, one or more paragraphs, or an entire document.

11. The computer-readable storage medium of claim 9, wherein the second input text comprises multiple words in order, one or more sentences, one or more phrases, one or more paragraphs, or an entire document.

12. The computer-readable storage medium of claim 9, wherein the machine learning module implements, based at least in part on the training data, short text classification.

* * * * *